United States Patent
Liao et al.

(10) Patent No.: US 9,723,301 B2
(45) Date of Patent: Aug. 1, 2017

(54) METHOD AND APPARATUS FOR CONTEXT-BASED VIDEO QUALITY ASSESSMENT

(71) Applicant: THOMSON LICENSING, Issy de Moulineaux (FR)

(72) Inventors: Ning Liao, Beijing (CN); Zhibo Chen, Beijing (CN); Fan Zhang, Hubei (CN)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 14/763,986

(22) PCT Filed: Jun. 9, 2013

(86) PCT No.: PCT/CN2013/077085
§ 371 (c)(1),
(2) Date: Jul. 28, 2015

(87) PCT Pub. No.: WO2014/121572
PCT Pub. Date: Aug. 14, 2014

(65) Prior Publication Data
US 2015/0365662 A1   Dec. 17, 2015

(30) Foreign Application Priority Data
Feb. 7, 2013   (WO) ............... PCT/CN2013/071540

(51) Int. Cl.
*G06K 9/40*   (2006.01)
*H04N 17/00*   (2006.01)
(Continued)

(52) U.S. Cl.
CPC ....... *H04N 17/004* (2013.01); *G06K 9/00536* (2013.01); *G06K 9/00711* (2013.01);
(Continued)

(58) Field of Classification Search
CPC .. H04N 19/115; H04N 19/103; H04N 19/154; H04N 17/004; G06K 9/00711;
(Continued)

(56) References Cited

U.S. PATENT DOCUMENTS 6,331,859 B1   12/2001  Crinon
6,671,324 B2   12/2003  Vetro et al.
(Continued)

FOREIGN PATENT DOCUMENTS

CN   101572830 A   11/2009
CN   101635846     1/2010
(Continued)

OTHER PUBLICATIONS

Hsu et al: "Arbitrary frame rate transcoding through temporal and spatial complexity", IEEE Transactions on Broadcasting, IEEE Service Center, vol. 55, n°4, Dec. 1, 2009, pp. 767-775.
(Continued)

*Primary Examiner* — Ali Bayat
(74) *Attorney, Agent, or Firm* — Brian J. Dorini; Xiaoan Lu

(57) ABSTRACT

Because neighboring frames may affect how a current frame is perceived, we examine different neighborhoods of the current frame and select a neighborhood that impacts the perceived temporal distortion (i.e., when frames are viewed continuously) of the current frame most significantly. Based on spatial distortion (i.e., when a frame is viewed independently of other frames in a video sequence) of frames in the selected neighborhood, we can estimate initial temporal distortion. To refine the initial temporal distortion, we also consider the distribution of distortion in the selected neighborhood, for example, the distance between the current frame and a closest frame with large distortion, or whether distortion occurs in consecutive frames.

17 Claims, 7 Drawing Sheets

(51) Int. Cl.
  *H04N 19/115* (2014.01)
  *H04N 19/103* (2014.01)
  *H04N 19/154* (2014.01)
  *G06K 9/00* (2006.01)
  *G06K 9/03* (2006.01)
  *G06T 7/00* (2017.01)

(52) U.S. Cl.
  CPC ............ *G06K 9/036* (2013.01); *G06T 7/0002* (2013.01); *H04N 19/103* (2014.11); *H04N 19/115* (2014.11); *H04N 19/154* (2014.11); *G06T 2207/10016* (2013.01); *G06T 2207/30168* (2013.01)

(58) Field of Classification Search
  CPC ................ G06K 9/036; G06K 9/00536; G06T 2207/10016; G06T 2207/30168; G06T 7/0002
  See application file for complete search history.

(56) References Cited

U.S. PATENT DOCUMENTS

| | | | |
|---|---|---|---|
| 6,885,757 B2 | 4/2005 | Bloom et al. | |
| 7,209,519 B2 | 4/2007 | Vetro et al. | |
| 7,298,865 B2 | 11/2007 | Lubin et al. | |
| 7,415,128 B2* | 8/2008 | Bloom .................. | G06T 1/0028 382/100 |
| 9,183,617 B2* | 11/2015 | Goh ..................... | H04N 19/117 |
| 9,232,217 B2* | 1/2016 | Argyropoulos ...... | H04N 17/004 |
| 2005/0157791 A1* | 7/2005 | Sun ...................... | H04N 19/196 375/240.16 |
| 2007/0127819 A1 | 6/2007 | Lee et al. | |
| 2007/0237227 A1 | 10/2007 | Yang et al. | |
| 2008/0174694 A1* | 7/2008 | Morad .................. | H04N 7/012 348/448 |
| 2009/0274390 A1 | 11/2009 | Le Meur et al. | |
| 2011/0311147 A1 | 12/2011 | Pahalawatta et al. | |
| 2012/0281142 A1 | 11/2012 | Pettersson et al. | |
| 2016/0212432 A1* | 7/2016 | Wang .................... | H04N 19/53 |

FOREIGN PATENT DOCUMENTS

| | | |
|---|---|---|
| CN | 101695141 | 4/2010 |
| CN | 102317974 | 1/2012 |
| CN | 102685548 | 9/2012 |
| CN | 102714752 | 10/2012 |
| EP | 1251701 | 10/2002 |
| JP | 4209197 | 10/2008 |
| JP | 2009273127 | 11/2009 |
| WO | WO2014012219 | 1/2014 |

OTHER PUBLICATIONS

Ninassi et al: "Considering temporal variations of spatial visual distortion in video quality assessment", IEEE Journal of selected topics in signal processing, vol. 3, No. 2, Apr. 2009, pp. 253-265.
Seshadrinathan et al: "Temporal hysteresis model of timevarying subjective video quality"; ICASSP 2011, pp. 1153-1156.
Masry et al: "A metric for continuous quality evaluation of compressed video with severe distortions"; Signal Processing: Image Communication, vol. 19, No. 2, pp. 133-146, Feb. 2004, 14 pages.
Pearson: "Viewer response to time-varying video quality", in Proc. SPIE, vol. 3299, No. 1, 1998, pp. 16-25.
ITU-R BT.500-13: Methodology for the subjective assessment of the quality of television pictures, Jan. 2012, 46 pages.

* cited by examiner

METHOD AND APPARATUS FOR CONTEXT-BASED VIDEO QUALITY ASSESSMENT

This application claims the benefit, under 35 U.S.C. §365 of International Application PCT/CN2013/077085 filed Jun. 9, 2013 which was published in accordance with PCT article 21(2) on Aug. 14, 2014 in English and which claims the benefit of PCT Application PCT/CN2013/071540 filed Feb. 7, 2013.

TECHNICAL FIELD

This invention relates to video quality measurement, and more particularly, to a method and apparatus for determining an objective video quality metric.

BACKGROUND

Different methods have been developed to estimate quality levels of individual frames in a video sequence. Given the estimated quality levels of individual frames in the video sequence, the methods of obtaining an objective overall video quality metric that matches well with the perceived quality of the video sequence has been studied under the umbrella of temporal pooling strategies.

SUMMARY

The present principles provide a method for estimating visual quality of a video sequence, comprising: determining a neighborhood of a current frame of the video sequence from a plurality of neighborhoods that include the current frame; determining initial temporal distortion for the current frame responsive to spatial distortion for frames in the determined neighborhood; determining a distribution of the spatial distortion for the frames in the determined neighborhood; determining temporal distortion for the current frame responsive to the initial temporal distortion and the distribution; and determining the visual quality of the video sequence responsive to the temporal distortion for the current frame as described below. The present principles also provide an apparatus for performing these steps.

The present principles also provide a method for estimating visual quality of a video sequence, comprising: determining a neighborhood of a current frame of the video sequence that has most impact, among a plurality of neighborhoods that include the current frame, on temporal distortion of the current frame; determining initial temporal distortion for the current frame responsive to spatial distortion for frames in the determined neighborhood; determining a distance between the current frame and a closest frame with large distortion in the determined neighborhood; determining the temporal distortion for the current frame responsive to the initial temporal distortion and the distance; and determining the visual quality of the video sequence responsive to the temporal distortion for the current frame as described below. The present principles also provide an apparatus for performing these steps.

The present principles also provide a computer readable storage medium having stored thereon instructions for estimating visual quality of a video sequence, according to the methods described above.

DETAILED DESCRIPTION

In the present application, we use "spatial artifact" to denote artifact perceived in a picture in a video sequence when the picture is viewed independently of other pictures in the video sequence, and use "temporal artifact" to denote artifact that is perceived in a picture of a video sequence when pictures in the video sequence are continuously displayed. Similarly, we use "spatial distortion" or "spatial quality" to denote distortion or quality perceived in a picture when the picture is viewed independently of other pictures in a video sequence, and use "temporal distortion" or "temporal quality" to denote distortion or quality that is perceived in a picture of a video sequence when pictures in the video sequence are continuously displayed.

When assessing spatial distortion, a picture is viewed independently of other pictures in the video sequence, for a period of time that is long enough for a viewer to recognize image content and distortion. This is different from assessing temporal distortion, wherein pictures are continuously displayed.

In the present application, the term "frame" is used interchangeably with the term "picture." The terms "distortion" and "artifact" both refer to quality degradation in a frame, and are often used interchangeably.

Spatial distortion of frame n, denoted as ds(n), can be obtained by various image quality assessment methods, for example, but not limited to, a full-reference or no-reference method, and a method in a pixel domain or at a bitstream level. In one embodiment, spatial distortion can be estimated as the overall visible artifact level, caused by initial and/or propagated visible artifact, as disclosed in a commonly owned PCT application, entitled "Video quality assessment at a bitstream level" by N. Liao, Z. Chen, and K. Xie (PCT/CN2012/078766), the teachings of which are specifically incorporated herein by reference.

Spatial artifact in pictures needs to last for a period of time so that eyes can fix on and recognize it as artifact. When the pictures are part of a video sequence and each is displayed only for a very short period of time (for example, a period of 1/frame_rate when the video is played in real time), the perceived video distortion at the time instant of frame n, i.e., temporal distortion at frame n, dt(n), can be quite different from spatial distortion of frame n, ds(n). This may be because temporal distortion dt(n) is affected by the content and distortion of its neighboring frames.

Figure 1A:
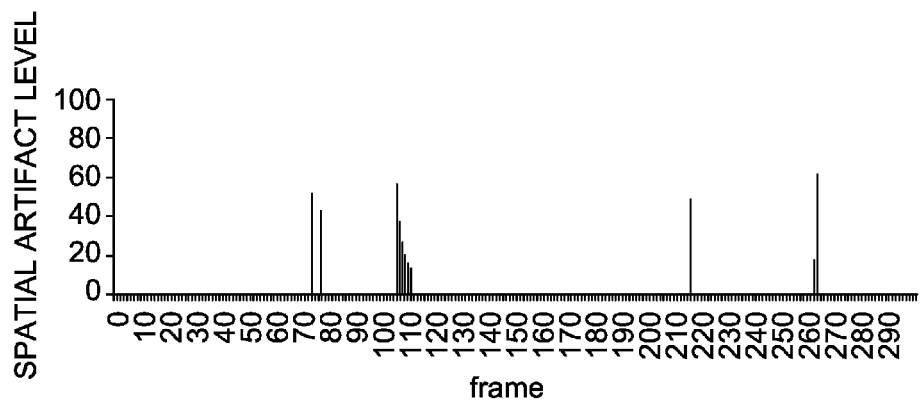
FIG. 1A is a pictorial example depicting spatial artifact levels for individual frames in an exemplary video sequence.
Figure 1B:
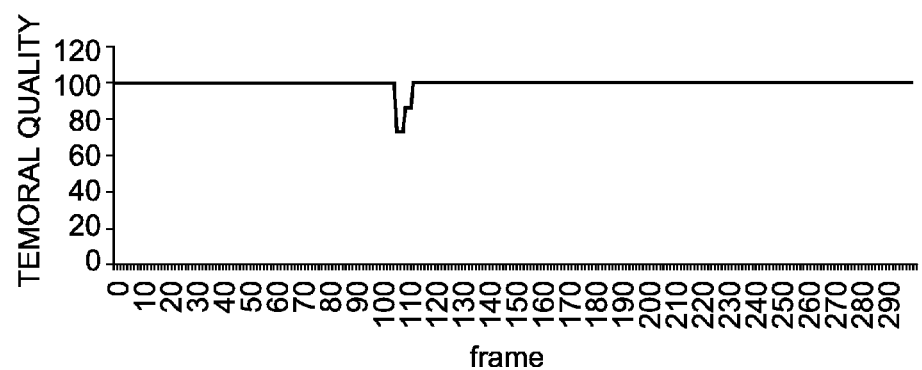
FIG. 1B is a pictorial example depicting perceived temporal quality for individual frames in the exemplary video sequence.

For an exemplary video sequence, FIG. 1A shows spatial artifact levels of individual frames in the video sequence, and FIG. 1B shows temporal quality of individual frames in the video sequence. More specifically, FIG. 1A shows spatial artifact levels of the frames when the exemplary video sequence suffers from packet losses. The spatial artifact may be sporadic in the video sequence, for example, the spatial artifact seen at frames 74, 77, 215, 261, and 262. The spatial artifact may also occur in a burst, such as the artifact seen around frames 106-111.

FIG. 1B shows temporal quality when the frames of the video sequence are displayed continuously, wherein score 100 corresponds to the best quality. Depending on the quality measurement method, the quality score may be at a different scale. The accurate curve of temporal quality may be obtained using a subjective test method, for example, but not limited to, Single Stimulus Continuous Quality Evaluation (SSCQE), as defined in ITU-R BT 500.

It can be seen from FIG. 1A that frames 74 and 77 have strong spatial artifact when these two frames are viewed independently. However, the artifact at these two frames becomes invisible when the video is displayed continuously, and thus, frames 74 and 77 are at the best quality level when viewed continuously as shown in FIG. 1B. Thus, strong spatial artifact may not always correspond to high temporal distortion. On the other hand, one frame of a video sequence may appear to have good quality when viewed independently of other frames, but may present very strong temporal distortion (for example, motion jitter) when the video sequence is displayed continuously. That is, small spatial distortion may not always correspond to small perceived temporal distortion (i.e., higher temporal quality).

Thus, spatial distortion (i.e., when a picture is viewed independently of other pictures in a video sequence) may be quite different from temporal distortion (i.e., when pictures are viewed continuously). The present principles provide a method and apparatus for accurately modeling temporal quality from spatial distortion for individual frames. Specifically, the present principles consider the context that affects how a viewer identifies temporal distortion, wherein the context includes, for example, but not limited to, the duration and the pattern of the distortion, and texture and object's motion that are recognized by a viewer via watching the neighboring frames.

Figure 2A:
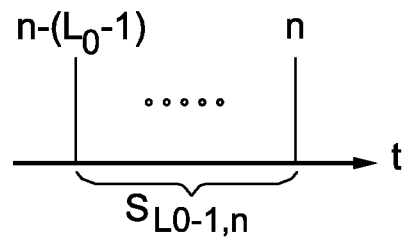
FIGS. 2A, 2B, and 2C are pictorial examples depicting sliding windows used in video quality modeling, in accordance with an embodiment of the present principles.
Figure 2B:
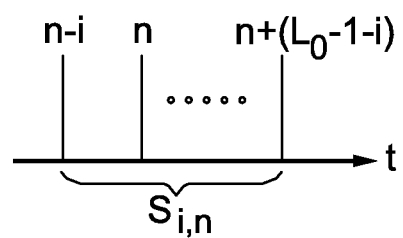
Figure 2C:
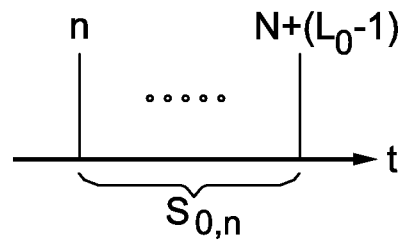

In one embodiment, given the spatial distortion, the perceived temporal distortion can be modeled using a sliding window approach. As shown in FIGS. 2A-2C, a sliding window of $L_0$ frames that includes frame n (denoted as $S_{i,n}$) starts at frame (n−i) and ends at frame (n−i+$L_0$−1), $0 \leq i < L_0$. We may choose a window length that approximates the period of time that is needed for a viewer's eyes to recognize distortion. Accordingly, a sliding window includes $L_0$=round($T_0$×frame_rate) frames, where $T_0$ is a period of time that is needed for a viewer to recognize distortion, and frame_rate is the frame rate of the video sequence. Artifact existing outside the sliding windows is regarded as having little contribution to the visibility of the temporal artifact of a current frame.

We observe that the perceived temporal distortion of a current frame is mainly affected by frames with large distortion (i.e., distortion level exceeds a certain threshold) that are close by. In the present principles, we provide different embodiments to estimate the impact of such clustered large spatial distortion in a frame's neighborhood.

In one embodiment, we may use the maximum of median distortion values in the sliding windows to estimate the temporal distortion. Mathematically, for each sliding window $S_{i,n}$, we can calculate the median distortion of the frames in $S_{i,n}$ as:

$$MD_{i,n} = \text{median}\{ds(j), \text{frame } j \in S_{i,n}\}. \quad (1)$$

A median function examines neighboring frames to decide whether or not the spatial distortion of the current frame is representative of its surroundings and rejects extreme distortion levels (outliers). That is, we may consider $MD_{i,n}$ as a representative distortion level for sliding window $S_{i,n}$. In other embodiment, we may use averaging or other filtering methods to obtain $MD_{i,n}$.

In all sliding windows that include frame n, the sliding window with larger distortion usually affects the visual quality more significantly. Thus, a maximum function can be used to identify the dominant distortion as the maximum of median distortion values among the sliding windows $\{S_{i,n}, 0 \leq i < L_0\}$:

$$m_n = \max\{MD_{i,n}, 0 \leq i < L_0\}. \quad (2)$$

Perceived temporal distortion for the current frame is observed to be largely determined by the dominant distortion in its neighborhood, rather than by the spatial distortion strength of the current frame. For example, when frame n has severe spatial distortion ds(n) which does not last long enough to be recognized, the perceived temporal distortion is mainly affected by distortion in its neighborhood. Thus, a minimum function can be used to set the temporal distortion for the current frame. That is, we may set temporal distortion dt(n) to the smaller one of the spatial distortion value and the maximum of median distortion values $m_n$ for frame n as:

$$dt(n) = \min\{m_n, ds(n)\}. \quad (3)$$

Figure 3A:
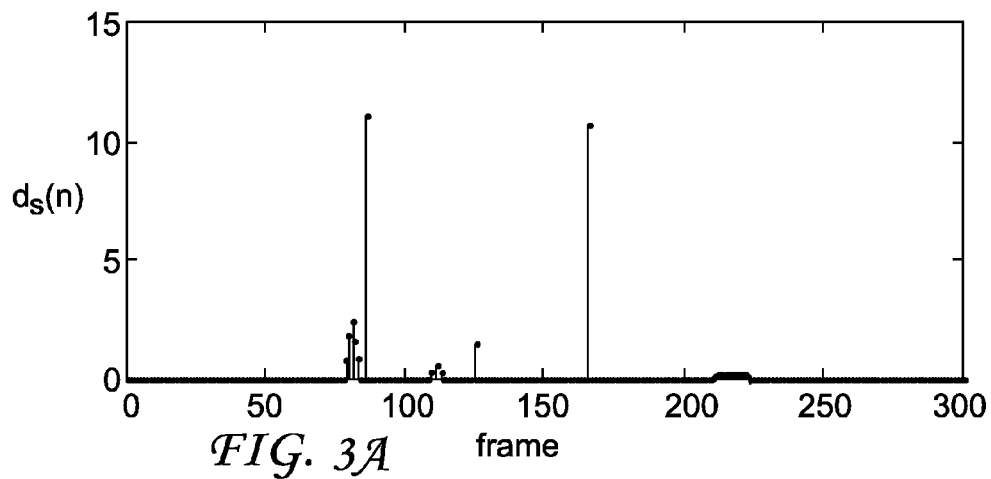
FIG. 3A is a pictorial example depicting spatial artifact levels for individual frames in another exemplary video sequence.
Figure 3B:
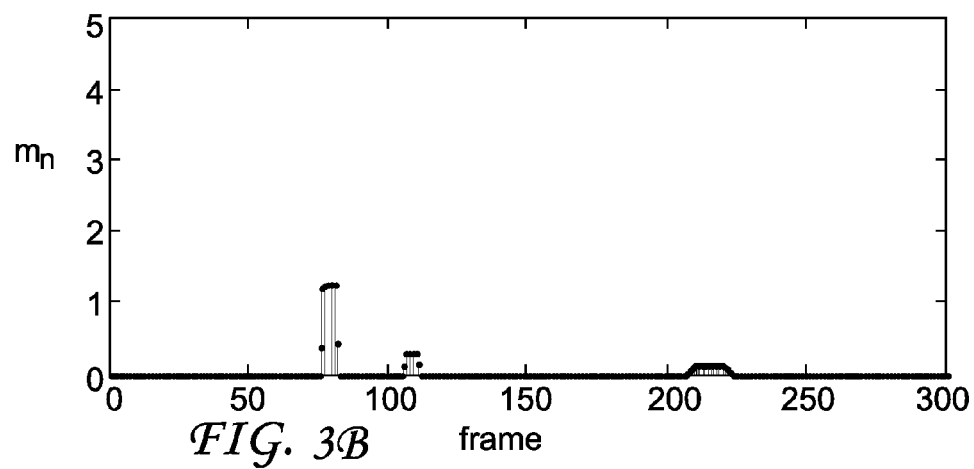
FIGS. 3B and 3C are pictorial examples depicting dominant distortion in a frame's neighborhood and estimated temporal distortion, respectively, in accordance with an embodiment of the present principles.
Figure 3C:
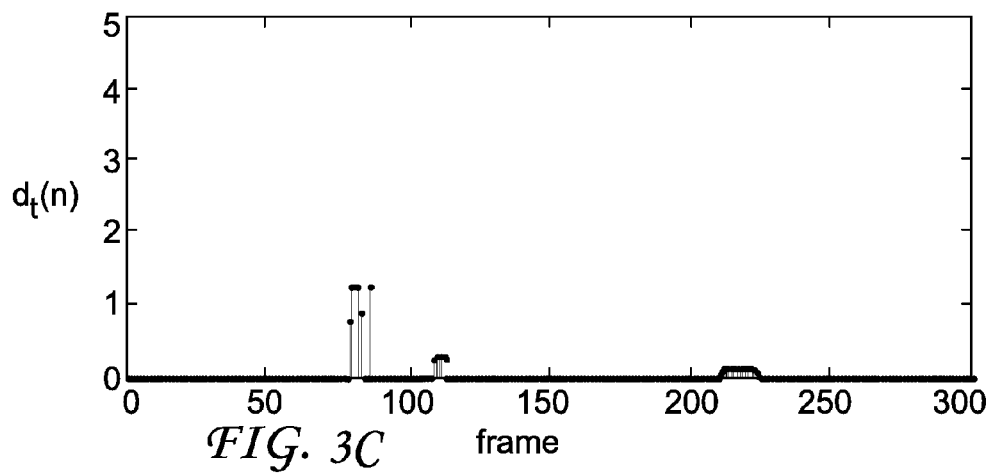

FIG. 3A shows spatial artifact levels for frames in an exemplary video sequence, and FIGS. 3B and 3C show results after applying Eqs. (2) and (3), respectively. By using a median function, the maximum of median distortion values avoid extreme values as shown in FIG. 3B. Consequently, as can be seen from FIG. 3C, spatial artifact levels that are much larger than neighboring ones, for example, at frames 86, 125, and 166, are not present in the estimated temporal distortion. In addition, the estimated temporal distortion levels have smaller variations from frame to frame than the spatial distortion levels.

In another embodiment, to estimate temporal distortion, we may use the maximum value of the ratios of frames with large distortion (i.e., the distortion level exceeds a certain threshold) in all the sliding windows $\{S_{i,n}, 0 \leq i < L_0\}$. Since smaller distortion usually becomes invisible when the video sequence is played continuously, we only consider frames with large distortion. Mathematically, for each sliding window $S_{i,n}$, we can calculate the ratio between the number of frames with large distortion in $S_{i,n}$ and the total number of frames in $S_{i,n}$ as:

$$R_{i,n} = \frac{\sum_j \mu(ds(j))}{L_0}, \text{ frame } j \in S_{i,n},$$ (4)

where $$\mu(x) = \begin{cases} 1, & x \geq U \\ 0, & \text{otherwise} \end{cases},$$

and U is a spatial distortion threshold. For ease of notation, we denote the ratio between the number of frames with large spatial distortion in a sliding window and the total number of frames in the sliding window as a large distortion density for the sliding window.

We observe that a sliding window with a higher density of larger distortion usually affects the visual quality more significantly. Thus, we calculate the highest ratio among all the sliding windows as:

$$w_n = \max\{R_{i,n}, 0 \leq i < L_0\}.$$ (5)

Then we can estimate the perceived temporal distortion at frame n as a weighted distortion:

$$dt(n) = w_n \times ds(n).$$ (6)

In addition, we observe that the distance between two nearest frames having large distortion also affects the perceived temporal distortion. That is, when two frames with large distortion are closer, the distortion becomes more visible to human eyes. Thus, the temporal distortion estimation may be improved by also considering the distance between frame n and a closest frame with large distortion. In one embodiment, Eq. (6) may be modified to become:

$$dt(n) = w_n \times ds(n)/f(\text{dist}(n)),$$ (7)

wherein dist(n) is the distance between frame n and the closest frame with large distortion in a sliding window corresponding to the highest large distortion density. If there is no other frame with large distortion in the corresponding sliding window, we set dist(n) to a very big value, for example, 1000. That is, when there is only one frame in the sliding window with large distortion, we consider the distortion as less visible and set dt(n) to a very small value. Different functions can be used to define f(dist(n)), for example, f(dist(n))=dist(n), or f(dist(n))=(dist(n))$^\alpha$, where $\alpha$ is a constant.

In a more general embodiment, we consider the temporal distortion estimated based on spatial distortion, for example, the temporal distortion obtained from Eq. (3) or (6), as initial temporal distortion. As discussed above, because neighboring frames may affect how the current frame is perceived, we examine different neighborhoods and select a neighborhood that impacts the perceived temporal distortion of the current frame most significantly. Within the selected neighborhood, we may get the median of spatial distortion values or a ratio of large distortion, which can be used to estimate the initial temporal distortion. In addition to the spatial distortion, other factors of the selected neighborhood, for example, the distance as shown in Eq. (7), can be used to refine the estimated temporal distortion.

More generally, the distribution of artifacts within the selected neighborhood, for example, whether the artifacts appear in consecutive frames or not, can be considered to affect the perceived temporal distortion, and thus, can be used to improve temporal distortion estimation. For ease of notation, we denote a group of contiguous frames with large distortion as a distortion burst. In one example, we may measure a mean distance between frames with contiguous large distortion within the selected neighborhood, or a mean distance between contiguous distortion bursts within the selected neighborhood. Because sporadic spatial distortion is less likely to catch a viewer's attention, within a selected neighborhood, the larger the mean distance is, the less visible the temporal distortion is. Other parameters that can be used to characterize the distribution of distortion may be a minimum distance or a maximum distance between distortion bursts or between frames with large distortion.

Moreover, motion information in the neighborhood may also be considered to account for quality degradation caused by motion jitter or motion jerkiness.

Figure 4A:
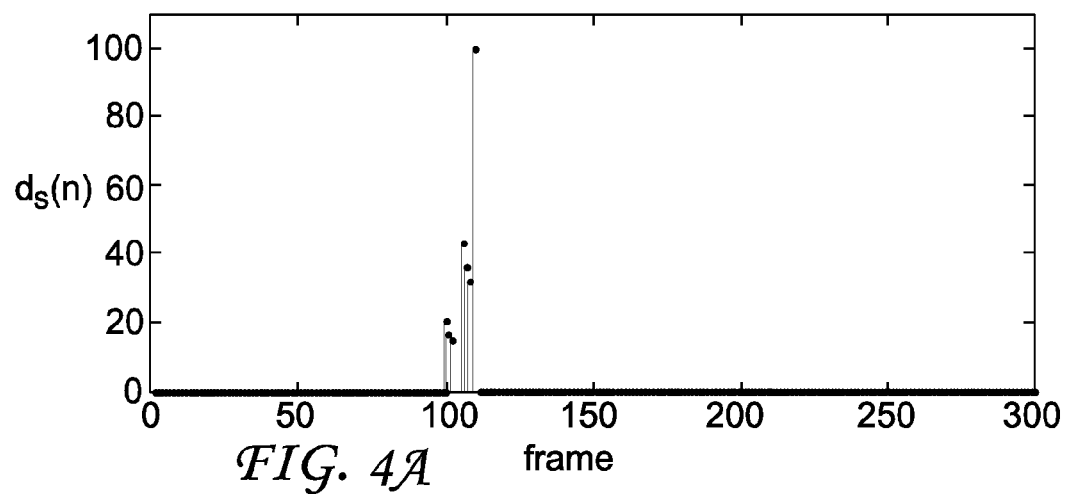
FIG. 4A is a pictorial example depicting spatial artifact levels for individual frames in another exemplary video sequence.
Figure 4B:
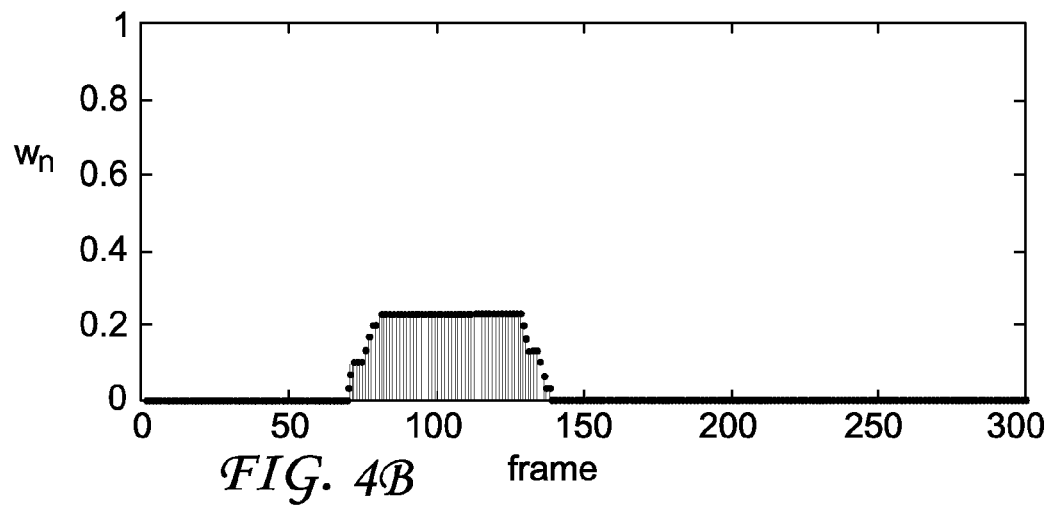
FIGS. 4B and 4C are pictorial examples depicting the highest large distortion density in a frame's neighborhood and estimated temporal distortion, respectively, in accordance with an embodiment of the present principles.
Figure 4C:
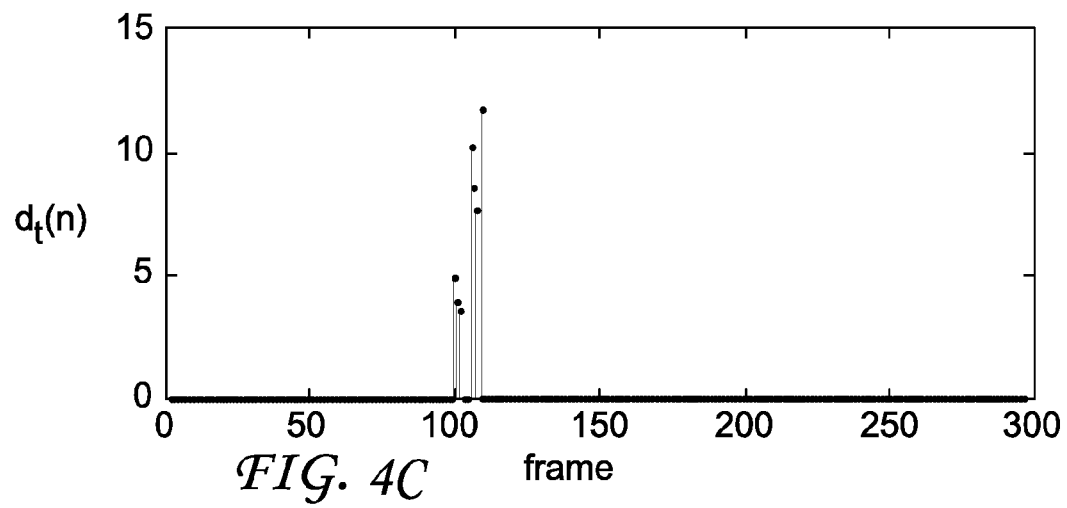
Figure 5A:
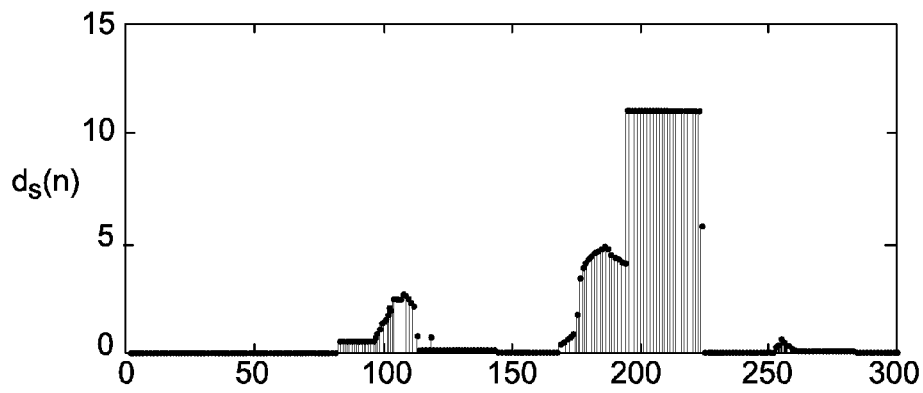
FIG. 5A is a pictorial example depicting spatial artifact levels for individual frames in another exemplary video sequence.
Figure 5B:
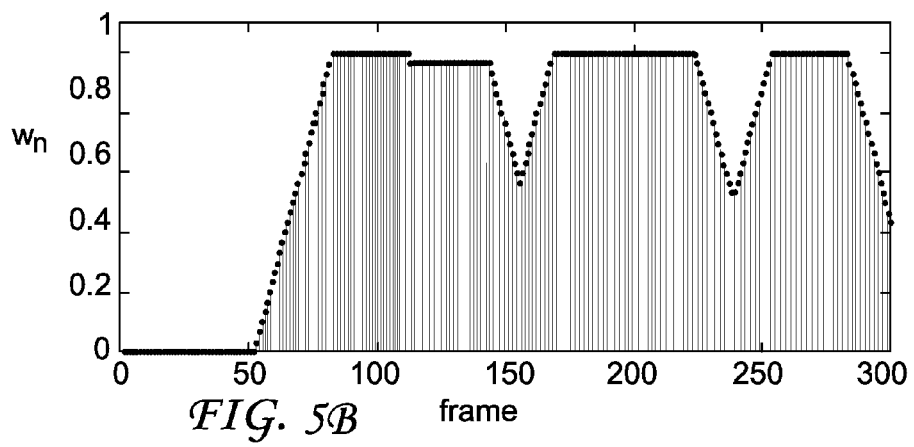
FIGS. 5B and 5C are pictorial examples depicting the highest large distortion density in a frame's neighborhood and estimated temporal distortion, respectively, in accordance with an embodiment of the present principles.
Figure 5C:
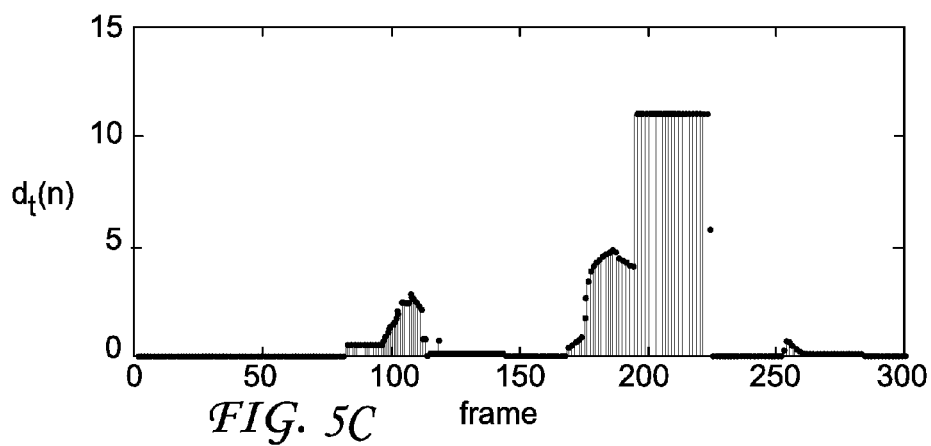

FIG. 4A shows spatial artifact levels for frames in an exemplary video sequence, and FIGS. 4B and 4C show results after applying Eqs. (5) and (7), respectively, wherein $L_0=1$ second, U=(number of macro blocks per frame)/100. The values of $L_0$ and U may vary with configurations, for example, with the GOP length, video resolution, and the frame rate. FIG. 5A shows spatial artifact levels for frames in another exemplary video sequence, and FIGS. 5B and 5C show results after applying Eqs. (5) and (7), respectively.

From FIGS. 4B and 5B, we observe that when large distortion is more clustered, the ratio becomes higher. That is, the ratio effectively reflects whether and to which degree neighboring frames affect the perceived quality of the current frame. Consequently, as can be seen from FIGS. 4C and 5C, the duration of frames with clustered large distortion (for example, around frame 106 in FIG. 4A, around frame 105 and frame 200 in FIG. 5A) affects the estimated temporal distortion levels. That is, a shorter duration of distortion as shown in FIG. 4A results in estimated temporal distortion that is much smaller than the spatial distortion, while a longer duration of distortion as shown in FIG. 5A results in estimated temporal distortion that is in the same order as the spatial distortion. This is consistent with the human perception, where lasting distortion has more negative impact on the perceived quality.

As discussed above, we consider contexts provided in neighboring frames to estimate temporal distortion for frame n. In one embodiment, as shown in Eqs. (1)-(3), we use the median distortion value. In another embodiment, as shown in Eqs. (4)-(7), we use the large distortion density. In yet another embodiment, the median distortion value and the large distortion density approaches can be combined to estimate the temporal distortion for frame n as:

$$dt(n) = w_n \times \min\{m_n, ds(n)\}.$$ (8)

In the above, we estimate temporal distortion based on the human vision property that eyes need a period of time that is long enough to recognize artifact. The temporal distortion may also be affected by other factors, for example, but not limited to, motion jerkiness. Consequently, the temporal distortion estimated as above may need to be adjusted to consider other factors. One exemplary combination can be $dt'(n)=dt(n)+c \times dt_2(n)$, where $dt_2(n)$ is the distortion caused by motion jerkiness.

Based on the temporal distortion for individual frames in a video sequence, {dt(n)}, the overall perceived distortion of the video sequence can be derived using a temporal pooling strategy. For example, a simple average operation can be used, that is, $$\text{overall distortion} = \frac{1}{N} \sum_{n=1}^{N} dt(n).$$

In another example, the distribution parameters, for example, the mean distance and minimum/maximum distance between distortion bursts in a video sequence may be used in temporal pooling.

Figure 6:
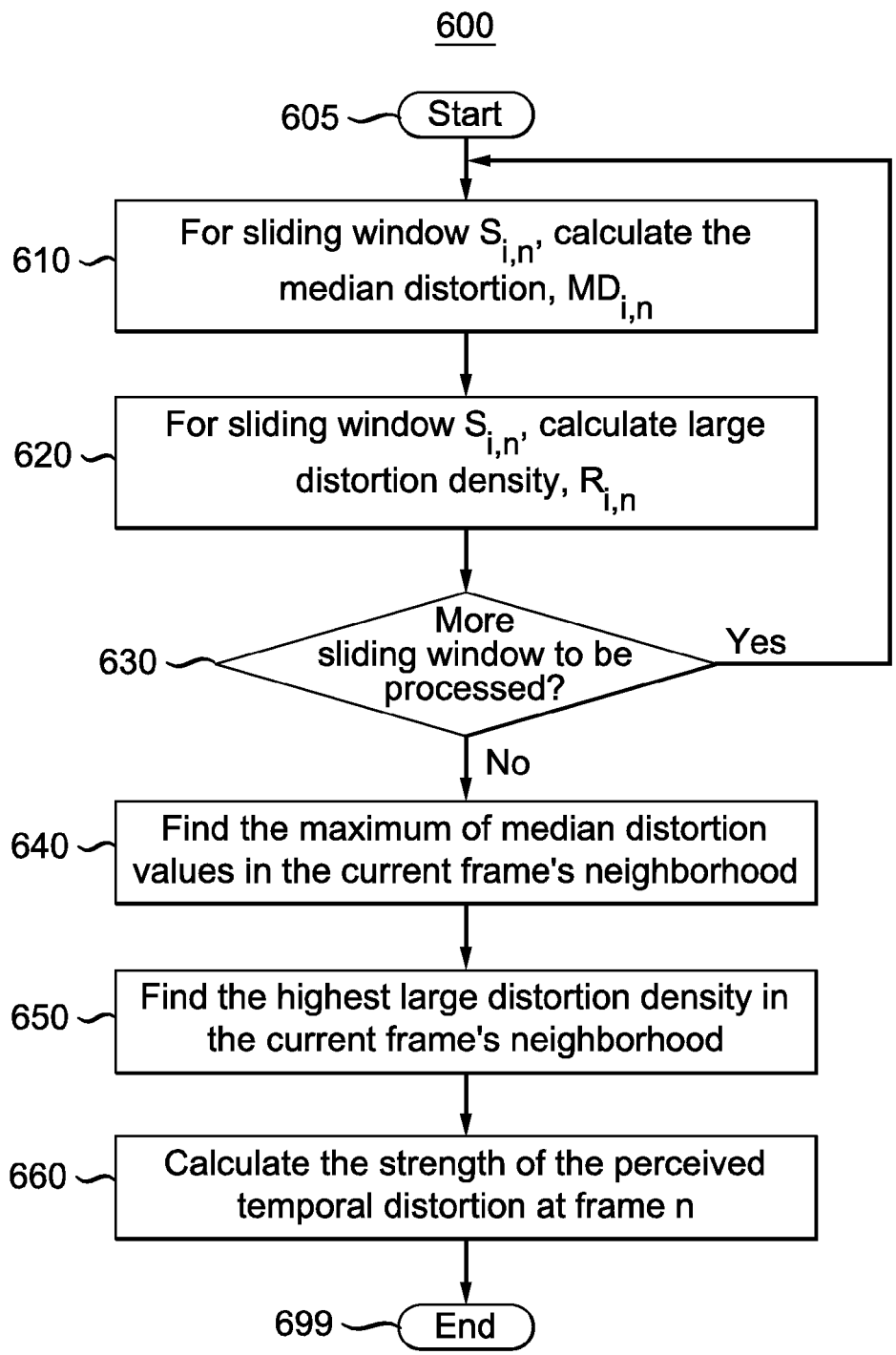
FIG. 6 is a flow diagram depicting an exemplary method for modeling temporal distortion at frame n, in accordance with an embodiment of the present principles.

FIG. 6 illustrates an exemplary method 600 for modeling temporal distortion at frame n, according to the present principles. Method 600 starts at step 605. For sliding window $S_{i,n}$, it calculates the median distortion value at step 610, for example, using Eq. (1), and calculates the large distortion density at step 620, for example, using Eq. (4). It checks whether more sliding window needs to be processed at step 630. If yes, it returns the control to step 610. Otherwise, at step 640, it calculates the maximum of median distortion values in all sliding windows for frame n, for example, using Eq. (2). At step 650, it calculates the highest large distortion density in all sliding windows for frame n, for example, using Eq. (5). At step 660, it estimates the temporal distortion for frame n, for example, using Eq. (3), (6), or (8). The distance between frame n and the closest frame with large distortion may be considered at step 660, for example, using Eq. (7). Method 600 ends at step 699.

In method 600, both the maximum of median distortion values and the highest large distortion density are used to estimate temporal distortion. In another embodiment, only the maximum of median distortion values is used to estimate the temporal distortion. That is, steps 620 and 650 are not needed, and step 660 estimates the temporal distortion based on the maximum of median distortion values, for example, using Eq. (3). In another embodiment, only the highest large distortion density is used to estimate the temporal distortion. That is, steps 610 and 640 are not needed, and step 660 estimates the temporal distortion based on the highest large distortion density, for example, using Eq. (6) or Eq. (7).

Method 600 or its variations may proceed in a different order of steps, for example, step 620 may be performed before step 610, step 650 may be performed before step 640.

The video quality modeling methods according to the present principles can be applied to measure video quality when a video sequence suffers from compression artifacts and/or packet losses. The present methods may be used in conjunction with spatial artifacts obtained at a bitstream level or a pixel level. That is, the present methods can be applied at both a bitstream level and a pixel level.

Figure 7:
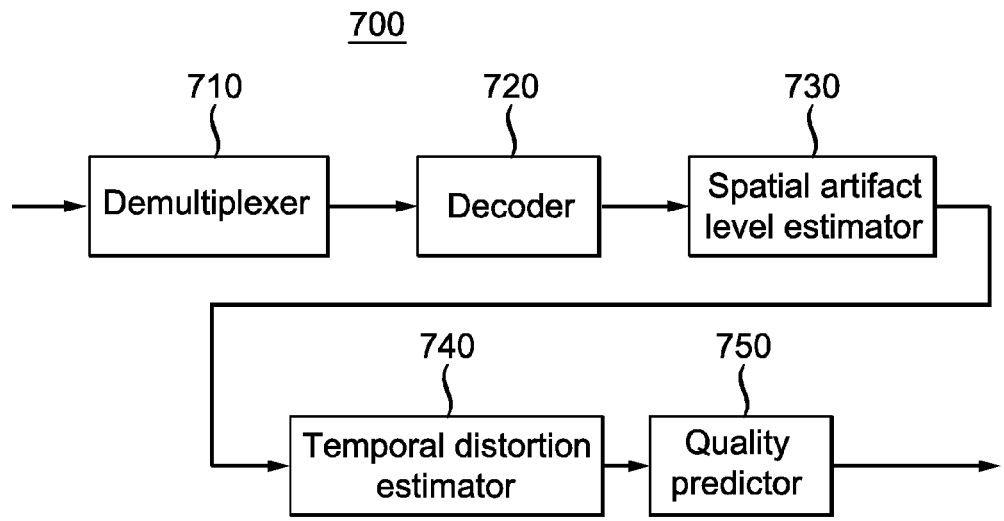
FIG. 7 is a block diagram depicting an exemplary video quality monitor, in accordance with an embodiment of the present principles.

The present principles may be used in a video quality monitor to measure video quality. FIG. 7 depicts a block diagram of an exemplary video quality monitor 700. The input of apparatus 700 may include a transport stream that contains the bitstream. The input may be in other formats that contains the bitstream.

Demultiplexer 710 obtains packet layer information from the bitstream. Decoder 720 parses the input stream to obtain more information. Decoder 720 may or may not reconstruct the pictures. In other embodiments, the decoder may perform the functions of the demultiplexer.

Using the decoded information, the spatial artifact levels are estimated in spatial artifact level estimator 730. Based on the estimated parameters, temporal distortion levels are estimated at temporal distortion estimator 740, for example, using method 600. A quality predictor 750 then pools temporal distortion levels for individual frames into a quality score for the video sequence. The quality predictor 750 may consider other types of artifacts and the property of human visual property.

The video quality monitor 700 may be used, for example, in ITU-T P.NBAMS (parametric non-intrusive bitstream assessment of video media streaming quality) standard, which works on video quality assessment models in two application scenarios, namely, IPTV and mobile video streaming, also called HR (High Resolution) scenario and LR (Low Resolution) scenario respectively. The difference between the two scenario ranges from the spatio-temporal resolution of video content and coding configuration to transport protocols and viewing conditions.

The input to the P.NBAMS VQM (Video Quality Model) is coded video bitstream with all transmission packet headers (UDP/IP/RTP or UDP/IP/RTP/TS). The output is an objective MOS score (Mean Opinion Score). A major target application of P.NBAMS work is to monitor video quality in a set-top box (STB) or gateway. P. NBAMS mode 1 model only uses bitstream information, and mode 2 model may decode part or all of the video sequence, and the pixel information is used for visual quality prediction in addition to parsing the bitstream information in order to improve the prediction accuracy.

Figure 8:
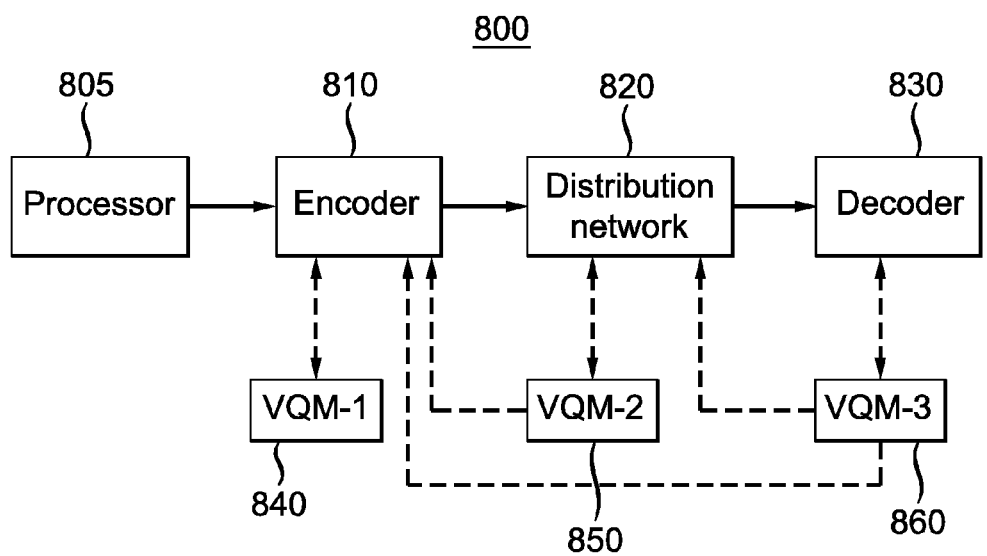
FIG. 8 is a block diagram depicting an exemplary video processing system that may be used with one or more implementations.

Referring to FIG. 8, a video transmission system or apparatus 800 is shown, to which the features and principles described above may be applied. A processor 805 processes the video and the encoder 810 encodes the video. The bitstream generated from the encoder is transmitted to a decoder 830 through a distribution network 820. A video quality monitor may be used at different stages.

In one embodiment, a video quality monitor 840 may be used by a content creator. For example, the estimated video quality may be used by an encoder in deciding encoding parameters, such as mode decision or bit rate allocation. In another example, after the video is encoded, the content creator uses the video quality monitor to monitor the quality of encoded video. If the quality metric does not meet a pre-defined quality level, the content creator may choose to re-encode the video to improve the video quality. The content creator may also rank the encoded video based on the quality and charges the content accordingly.

In another embodiment, a video quality monitor 850 may be used by a content distributor. A video quality monitor may be placed in the distribution network. The video quality monitor calculates the quality metrics and reports them to the content distributor. Based on the feedback from the video quality monitor, a content distributor may improve its service by adjusting bandwidth allocation and access control.

The content distributor may also send the feedback to the content creator to adjust encoding. Note that improving encoding quality at the encoder may not necessarily improve the quality at the decoder side since a high quality encoded video usually requires more bandwidth and leaves less bandwidth for transmission protection. Thus, to reach an optimal quality at the decoder, a balance between the encoding bit rate and the bandwidth for channel protection should be considered.

In another embodiment, a video quality monitor 860 may be used by a user device. For example, when a user device searches videos in Internet, a search result may return many videos or many links to videos corresponding to the requested video content. The videos in the search results may have different quality levels. A video quality monitor can calculate quality metrics for these videos and decide to select which video to store. In another example, the user device may have access to several error concealment techniques. A video quality monitor can calculate quality metrics for different error concealment techniques and automatically choose which concealment technique to use based on the calculated quality metrics.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for estimating visual quality of a video sequence, comprising:
   determining a neighborhood of a current frame of the video sequence from a plurality of neighborhoods that include the current frame;
   determining initial temporal distortion for the current frame responsive to spatial distortion for frames in the determined neighborhood;
   determining a distribution of the spatial distortion for the frames in the determined neighborhood;
   determining temporal distortion for the current frame responsive to the initial temporal distortion and the distribution; and
   determining the visual quality of the video sequence responsive to the temporal distortion for the current frame.

2. The method of claim 1, wherein the determined neighborhood has a highest density of frames with large distortion among the plurality of neighborhoods and has most impact on the temporal distortion of the current frame among the plurality of neighborhoods.

3. The method of claim 1, wherein the neighborhood of the current frame is determined based on a sliding window approach.

4. The method of claim 1, wherein the determining the distribution comprises:
   determining a distance between the current frame and a closest frame with large distortion in the determined neighborhood, wherein the temporal distortion is determined responsive to the initial temporal distortion and the distance.

5. The method of claim 4, wherein the temporal distortion dt(n) for the current frame is determined as:

$$dt(n)=d_{t,0}(n)/\text{dist}(n),$$

wherein $d_{t,0}(n)$ is the initial temporal distortion for the current frame, and dist(n) is the determined distance.

6. The method of claim 1, wherein the determining the distribution comprises:
   determining a mean, minimum, or maximum of distances between frames with contiguous large distortion in the determined neighborhood, wherein the temporal distortion is determined responsive to the determined mean, minimum, or maximum distance.

7. The method of claim 1, wherein the determining the distribution comprises:
   determining a mean, minimum, or maximum of distances between contiguous distortion bursts in the determined neighborhood, wherein the temporal distortion is determined responsive to the determined mean, minimum, or maximum distance.

8. The method of claim 1, further comprising:
   performing at least one of monitoring quality of a bitstream, adjusting the bitstream in response to the determined visual quality, creating a new bitstream based on the determined visual quality, adjusting parameters of a distribution network used to transmit the bitstream, determining whether to keep the bitstream based on the determined visual quality, and choosing an error concealment mode at a decoder.

9. An apparatus for estimating visual quality of a video sequence, comprising at least a memory and one or more processors, the one or more processors configured to:
  determine a neighborhood of a current frame of the video sequence from a plurality of neighborhoods that include the current frame;
  determine initial temporal distortion for the current frame responsive to spatial distortion for frames in the determined neighborhood;
  determine a distribution of the spatial distortion for the frames in the determined neighborhood;
  determine temporal distortion for the current frame responsive to the initial temporal distortion and the distribution; and
  determine the visual quality of the video sequence responsive to the temporal distortion for the current frame.

10. The apparatus of claim 9, wherein the determined neighborhood has a highest density of frames with large distortion among the plurality of neighborhoods and has most impact on the temporal distortion of the current frame among the plurality of neighborhoods.

11. The apparatus of claim 9, wherein the one or more processors are configured to determine the neighborhood of the current frame based on a sliding window approach.

12. The apparatus of claim 9, wherein the one or more processors are configured to determine a distance between the current frame and a closest frame with large distortion in the determined neighborhood, and to determine the temporal distortion responsive to the initial temporal distortion and the distance.

13. The apparatus of claim 12, wherein the one or more processors are configured to determine the temporal distortion dt(n) for the current frame as:

$$dt(n) \times d_{t,0}(n)/\text{dist}(n),$$

wherein $d_{t,0}(n)$ is the initial temporal distortion for the current frame, and dist(n) is the determined distance.

14. The apparatus of claim 9, wherein the one or more processors are configured to determine a mean, minimum, or maximum of distances between frames with contiguous large distortion in the determined neighborhood, and wherein the temporal distortion estimator is configured to determine the temporal distortion responsive to the determined mean, minimum, or maximum distance.

15. The apparatus of claim 9, wherein the one or more processors are configured to determine a mean, minimum, or maximum of distances between contiguous distortion bursts in the determined neighborhood, and to determine the temporal distortion responsive to the determined mean, minimum, or maximum distance.

16. The apparatus of claim 9, wherein the one or more processors are further
  configured to perform at least one of monitoring quality of a bitstream, adjusting the bitstream in response to the determined visual quality, creating a new bitstream based on the determined visual quality, adjusting parameters of a distribution network used to transmit the bitstream, determining whether to keep the bitstream based on the determined visual quality, and choosing an error concealment mode at a decoder.

17. A non-transitory computer readable storage medium having stored thereon instructions for estimating visual quality of a video sequence, the estimating comprising:
  determining a neighborhood of a current frame of the video sequence from a plurality of neighborhoods that include the current frame;
  determining initial temporal distortion for the current frame responsive to spatial distortion for frames in the determined neighborhood;
  determining a distribution of the spatial distortion for the frames in the determined neighborhood;
  determining temporal distortion for the current frame responsive to the initial temporal distortion and the distribution; and
  determining the visual quality of the video sequence responsive to the temporal distortion for the current frame.

* * * * *